US012716289B1

(12) United States Patent
Flannery et al.

(10) Patent No.: US 12,716,289 B1
(45) **Date of Patent: *Aug. 25, 2026**

(54) VISUAL INDICATOR FOR A PRESSURIZED BARRIER

(71) Applicant: Regalo International, LLC, Burnsville, MN (US)

(72) Inventors: Mark A. Flannery, Longboat Key, FL (US); Michael P. Lane, Chaska, MN (US); Kyle J. Willette, Savage, MN (US)

(73) Assignee: Regalo International, LLC, Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,483

(22) Filed: Dec. 30, 2023

Related U.S. Application Data

(63) Continuation of application No. 17/372,457, filed on Jul. 10, 2021, now Pat. No. 11,859,443.

(60) Provisional application No. 63/052,445, filed on Jul. 15, 2020.

(51) Int. Cl.
*E06B 9/02* (2006.01)
*E05B 41/00* (2006.01)
*E06B 9/00* (2006.01)

(52) U.S. Cl.
CPC ................ *E06B 9/02* (2013.01); *E05B 41/00* (2013.01); *E06B 2009/002* (2013.01)

(58) Field of Classification Search
CPC ... E05B 41/00; E05B 9/02; E05B 9/04; E05B 9/06; E05B 9/08; E05B 9/56; E05B 9/60; E06B 2009/002; E06B 11/02; A01K 1/0017
See application file for complete search history.

(56) References Cited

U.S. PATENT DOCUMENTS

| | | | |
|---|---|---|---|
| 2,225,436 | A | 12/1940 | Lang |
| 4,628,635 | A | 12/1986 | Maillard |
| 5,442,881 | A | 8/1995 | Asbach |
| 5,575,353 | A | 11/1996 | Cafaro |
| 6,178,693 | B1 | 1/2001 | Hunt |
| 6,301,832 | B1 | 10/2001 | Andersen |

(Continued)

FOREIGN PATENT DOCUMENTS

| | | | |
|---|---|---|---|
| EP | 2913472 | A1 | 9/2015 |
| GB | 2267725 | A | 12/1993 |

(Continued)

OTHER PUBLICATIONS

"Spring." Merriam-Webster.com Dictionary, Merriam-Webster, https://www.merriam-webster.com/dictionary/spring. Accessed Dec. 12, 2024. (Year: 2024).*

(Continued)

*Primary Examiner* — Kristina R Fulton
*Assistant Examiner* — Emily G. Brown

(57) ABSTRACT

A two part pressurized hand wheel for letting the user know when a gated pressurized barrier has been set up properly. One part of the hand wheel, when turned, begins to cover up a red portion of the second part. When the red portion is completely covered up, such is the signal to the user that the latch of the gated pressurized barrier is properly aligned with the latch receiver of the gated pressurized barrier.

6 Claims, 4 Drawing Sheets

(56) References Cited

U.S. PATENT DOCUMENTS

| | | | | |
|---|---|---|---|---|
| 6,308,462 | B1* | 10/2001 | Andersen | E06B 9/04 49/465 |
| 8,713,851 | B2 | 5/2014 | Flannery et al. | |
| 9,151,108 | B1 | 10/2015 | Flannery et al. | |
| 9,279,284 | B1 | 3/2016 | Axelrod | |
| 9,394,726 | B1 | 7/2016 | Flannery et al. | |
| 9,874,055 | B1 | 1/2018 | Flannery | |
| 9,874,056 | B1 | 1/2018 | Flannery et al. | |
| 9,982,479 | B1 | 5/2018 | Flannery et al. | |
| 9,995,063 | B2 | 6/2018 | Andersen | |
| 2001/0025545 | A1 | 10/2001 | Rogers | |
| 2004/0238806 | A1* | 12/2004 | Hicks | E06B 9/04 256/19 |
| 2006/0180283 | A1* | 8/2006 | Andersen | E06B 9/00 160/215 |
| 2006/0207180 | A1 | 9/2006 | Cheng | |
| 2008/0202047 | A1 | 8/2008 | Flannery | |
| 2009/0293363 | A1 | 12/2009 | Flannery | |
| 2010/0083577 | A1* | 4/2010 | Flannery | E06B 9/0615 49/130 |
| 2012/0144745 | A1 | 6/2012 | Yates | |
| 2013/0125470 | A1 | 5/2013 | Dunn | |
| 2013/0160365 | A1 | 6/2013 | Flannery | |
| 2016/0245381 | A1 | 8/2016 | Birkert | |
| 2016/0245501 | A1 | 8/2016 | Dunn | |
| 2017/0058594 | A1 | 3/2017 | Marsden | |
| 2017/0067284 | A1 | 3/2017 | Wang | |
| 2017/0350165 | A1 | 12/2017 | Schort | |
| 2019/0234139 | A1 | 8/2019 | Flannery | |
| 2022/0195790 | A1* | 6/2022 | Losik | E06B 9/02 |

FOREIGN PATENT DOCUMENTS

| | | | | | |
|---|---|---|---|---|---|
| GB | 2303666 | A | | 2/1997 | |
| GB | 2317637 | A | * | 4/1998 | E06B 9/02 |
| WO | 2012107335 | A1 | | 8/2012 | |

OTHER PUBLICATIONS

"On." Merriam-Webster.com Dictionary, Merriam-Webster, https://www.merriam-webster.com/dictionary/on. Accessed Sep. 9, 2025. (Year: 2025).*

* cited by examiner

VISUAL INDICATOR FOR A PRESSURIZED BARRIER

This application is a continuation of U.S. patent application Ser. No. 17/372,457 filed Jul. 10, 2021 (U.S. Pat. No. 11,859,443 issued Jan. 2, 2024) and claims the benefit thereof under 35 U.S.C. § 120, which application claims the benefit under 35 U.S.C. 119 (e) of U.S. Provisional Patent Application No. 63/052,445 filed Jul. 15, 2020, all of which applications are hereby incorporated by reference in their entireties into this application.

FIELD OF THE INVENTION

The present invention relates to a visual indicator and particularly to a visual indicator on a gated pressurized barrier that indicates when, during a set up process, the latch and latch receiver are properly aligned with each other.

BACKGROUND OF THE INVENTION

A gated pressurized barrier is set up by the end user. The end user often misunderstands the initial structure of the gated pressurized barrier because the gated pressurized barrier arrives with the latch offset from the latch receiver. However, the gated pressurized barrier is pressurized such as between two door jambs during the set up process and such draws the latch and latch receiver together. The present invention aids the end user to arrive at the final operating position.

SUMMARY OF THE INVENTION

A feature of the present invention is the provision in a visual indicator, of a visual indicator being mounted between a gated pressurized barrier and an upright surface.

Another feature of the present invention is the provision in a visual indicator, of the gated pressurized barrier having a gate, a latch, and a latch receiver.

Another feature of the present invention is the provision in a visual indicator, of a threaded shaft having first and second end portions, where the first end portion extends into the gated pressurized barrier, and where the second end portion confronts the upright surface.

Another feature of the present invention is the provision in a visual indicator, of a first housing portion and second housing portion engaged to each other and slideable to and away from each other, where the first housing portion threadingly engages the threaded shaft, and where the second housing portion slides on the threaded shaft.

Another feature of the present invention is the provision in a visual indicator, of a coil spring engaged between the first and second housing portions and on the threaded shaft, where the coil spring is biased to continuously push the first and second housing portions away from each other, where the coil spring is compressed when the second housing portion is stopped from sliding axially on the threaded shaft by a portion of the gated pressurized barrier and when, at the same time the second housing portion stops sliding axially, the first housing portion continues to rotate so as to move axially over a portion of the second housing until the latch and latch receiver are drawn to an operating position relative to each other.

Another feature of the present invention is the provision in a visual indicator, of a portion of the second housing including a first color, of a portion of the second housing including a second color, and where, when the base portion covers up the first color and encounters the second color, the latch and latch receiver have arrived at their respective operating positions.

Another feature of the present invention is the provision in a visual indicator, of a pressure of the coil spring being selected based upon a pressure of the gated pressurized barrier.

An advantage of the present invention is that a user has a second tool to determine whether the latch and latch receiver in a gated pressurized barrier are properly related to each other, where the first tool is an actual test of an engagement of the latch and latch receiver themselves, and where the second tool is a visual indication by the visual indicator that communicates when the latch and latch receiver are set properly relative to each other.

DESCRIPTION

Figure 1:
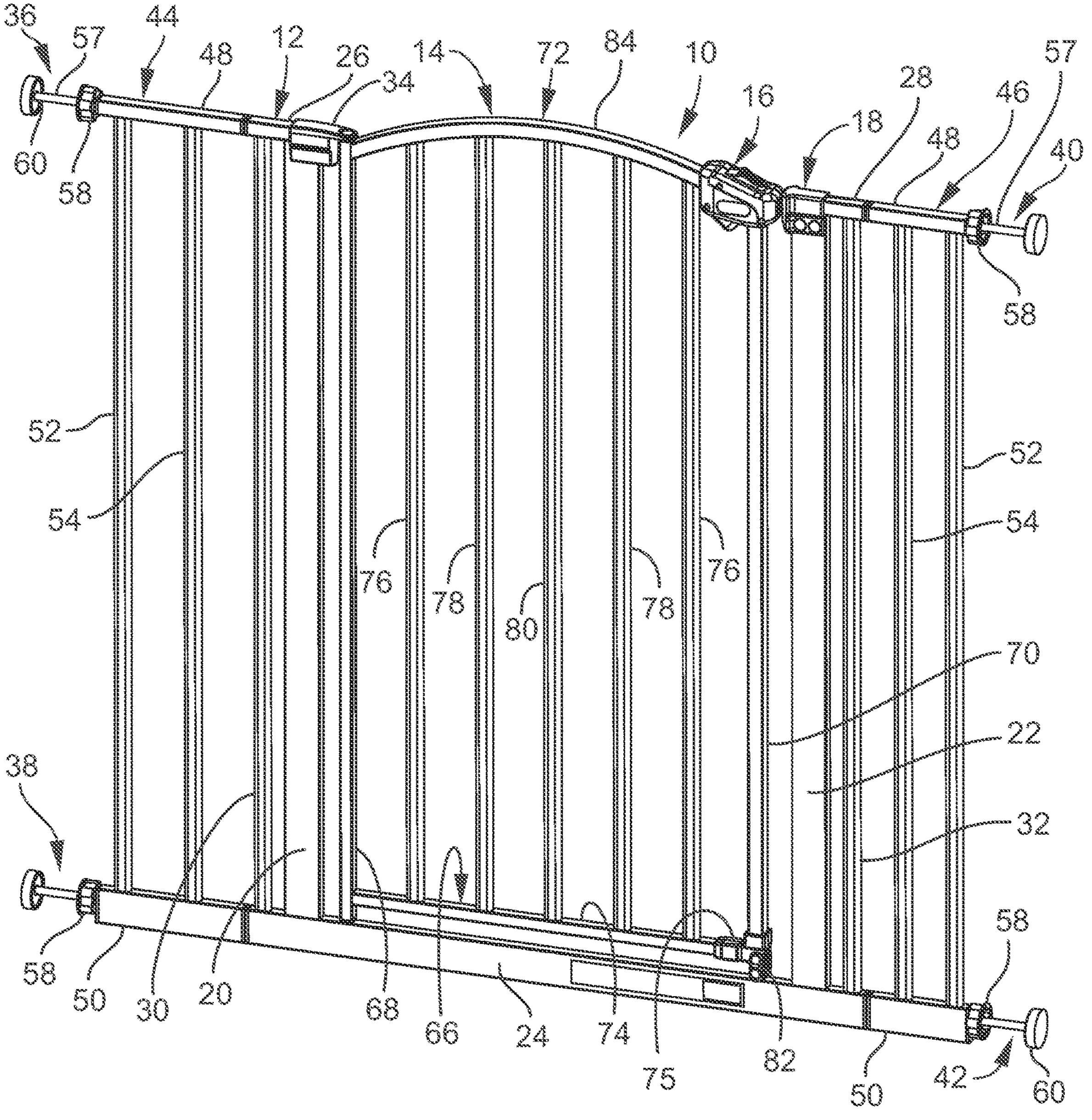
FIG. 1 is a perspective view of a gated pressurized barrier having the present visual indicator.

As shown in FIG. 1, a gated barrier is indicated by the reference number 10. Gated barrier 10 includes a barrier frame 12, a gate 14, a latch apparatus 16, and a latch receiver 18.

The barrier frame 12 is one-piece and integral and includes a first upright standard 20, a second standard 22 and a horizontally extending lowermost threshold frame member 24. The standards 20, 22 and threshold 24 form an upright U-shape so as to include an open top. Standards 20, 22, and threshold 24 are tubular and formed of metal such as steel or aluminum. Standards 20, 22 and threshold 24 are rectangular in section. Standard 20 is offset from one end of threshold 24. Standard 22 is offset from the other end of threshold 24.

Barrier frame 12 includes an outwardly extending horizontal upper frame member 26 that extends in a one-piece and integral fashion outwardly from the top of standard 20. Barrier frame 12 includes an outwardly extending horizontal upper frame member 28 that extends in a one-piece and integral fashion outwardly from the top of standard 22. Upper frame members 26, 28 are square in section and tubular and formed of metal such as steel or aluminum.

Barrier frame 12 includes a vertically extending frame member 30 extending to and between the upper frame member 26 and the threshold 24. Vertical frame member 30 runs parallel to standard 20. Vertical frame member 30 is one-piece and integral with upper frame member 26 and threshold 24. Vertical frame member 30 is oblong shaped in section from the upper frame member 26 to the threshold 24. Vertical frame member 30 is tubular and formed of metal, such as steel or aluminum. Vertical frame member 30 is spaced inwardly from the outer end of upper frame member 26 and its respective outer end of the threshold 24. Vertical frame member 30 is adjacent to and spaced apart from standard 20. Vertical frame member 30 is set outwardly of standard 20.

Barrier frame 12 includes a vertically extending frame member 32 extending to and between the upper frame member 28 and the threshold 24. Vertical frame member 32 runs parallel to standard 22. Vertical frame member 32 is one-piece and integral with upper frame member 28 and threshold 24. Vertical frame member 32 is oblong shaped in section from the upper frame member 28 to the threshold 24. Vertical frame member 32 is tubular and formed of metal, such as steel or aluminum. Vertical frame member 32 is spaced inwardly from the outer end of upper frame member 28 and its respective outer end of the threshold 24. Vertical frame member 32 is adjacent to and spaced apart from standard 22. Vertical frame member 32 is set outwardly of standard 22.

Barrier frame 12 includes an upper inwardly extending piece 34 that is one-piece with the barrier frame 12 and is formed of plastic. Piece 34 includes a receiver formed therein for receiving an upper and inner corner of standard 20. The receiver extends upwardly from a bottom of the piece 34 and inwardly from an outer side of the piece 34. The receiver is internal of piece 34.

Barrier frame 12 includes the latch receiver 18. Latch receiver 18 is an upper inwardly extending piece that is one-piece with the barrier frame 12 and is formed of plastic. Latch receiver 18 includes a receiver formed therein for receiving an upper and inner corner of standard 22. The receiver extends upwardly from a bottom of the latch receiver 18 and inwardly from an outer side of the latch receiver 18. The receiver is internal of the latch receiver 18.

Gated barrier 10 is a pressure gate. That is, at the factory the barrier frame 12 is manufactured so as to naturally space the latch receiver 18 from the latch apparatus 16. One way to achieve such a result is to fabricate the inside angle between the threshold 24 and the standard 22 to be obtuse. Obtuse means greater than a ninety degree angle. Another way to achieve such a result is to fabricate the inside angle between the threshold 24 and standard 20 to be obtuse. Another way to achieve such a result is to fabricate the barrier frame 12 such that both such inside angles are obtuse. Such inside angles are the angles between the inner edges of the standards 20, 22 and the upper edge of the threshold 24. At the time up set up, the end user operates the hand wheel apparatus 36, 38, 40, 42 to fix the gated barrier 10 between two opposing vertical surfaces. Namely, the end user operates hand wheel apparatus 40 to push the latch receiver 18 into an operating relationship with the latch apparatus 16. A proper operating state of the gated barrier 10 is where, for example, the axis of standard 20 is drawn or pushed to become parallel with the axis of standard 22 or where, for example, the axis of standard 22 is drawn or pushed into a right angle with the axis of threshold 24 or where, for example, the axis of standard 20 is drawn or pushed into a right angle relationship with the axis of threshold 24 or where, for example, the axis of standard 20 and the axis of standard 22 is drawn or pushed into a right angle relationship with the axis of threshold 24 or where, for example, the latch receiver 18 is drawn to a proper operating position with latch apparatus 16. The pressure bias of the pressure gate or gated barrier 10 is maintained naturally over the life of the gated barrier 10 such that when the hand wheels 36, 38, 40, 42 are operated so as to take down the gated barrier 10, the latch receiver 18 will naturally draw apart from the latch apparatus 16. In other words, one or more of such inside angles will return to the obtuse state in which it was fabricated.

Frame 12 may include frame extensions 44 and 46. Each of the frame extensions 44, 46 includes upper and lower horizontally extending frame members 48, 50. Upper frame member 48 is square in section, tubular, formed of metal such as steel or aluminum, and includes the same depth and height as upper frame member 26. Lower frame member 50 is rectangular in section, tubular, formed of metal such as steel or aluminum, and includes the same depth and height as the threshold 24. Integral and one-piece with the upper and lower frame members 48, 50 are a pair of vertically extending frame members 52, 54. Each of the vertically extending frame members 52, 54 are oblong in section from the upper frame member 48 to the lower frame member 50, tubular, and formed of metal such as steel or aluminum. Vertical frame member 52 is an outer frame member. Vertical frame member 54 is an inner frame member. Vertical frame members 52, 54 are adjacent to and spaced apart from each other. Vertical frame member 52 is spaced inwardly from the outer ends of frame members 48, 50. Vertical frame member 54 is spaced outwardly from the inner ends of frame members 48, 50. Inner vertical frame member 54 is adjacent to and spaced apart from standard 20. Each of the inner ends of each of the upper and lower frame members 48, 50 includes a rod rigidly affixed thereto and extending inwardly. The rod is inserted into an opening in a piece or plug that closes off the otherwise open outer end of the threshold 24 and upper frame member 26 or 28. The opening in this piece or plug is the opening that receives a shaft of one of the hand wheel apparatus 36, 38, 40, 42. Such piece or plug may be frictionally set in such open end or may be welded to such open end. This piece or plug closes off the a) the otherwise open outer ends of the threshold 24, b) the otherwise open outer end of the upper horizontal frame member 26, c) the otherwise open outer end of upper horizontal frame member 28, d) the otherwise open inner ends of upper frame members 48, e) the otherwise open inner ends of the lower frame members 50, f) the otherwise open outer ends of the upper frame members 48, and g) the otherwise open outer ends of the lower frame members 50. All pieces plugs include a circular opening. In the pieces or plugs found on the inner ends of upper and lower frame members 48, 50, the above mentioned rod that is rigidly affixed to such inner ends extends through the circular opening found in such pieces or plugs. Such rod then extends through the circular opening in the adjacent piece or plug found 1) on the outer ends of the threshold 24, 2) the outer end of upper frame member 26, and 3) the outer end of upper frame member 28.

The gated barrier 10 includes the hand wheel apparatus 36, 38, 40, 42. Each of the hand wheel apparatus 36, 38, 40, 42 includes a threaded shaft 57, a two part pressurized hand wheel 58 turnable on and threadingly engaged to the threaded shaft 57, and a disk 60 fixedly engaged to the outer end of the threaded shaft 57. The threaded shaft 57 slidingly engages the circular opening in the piece or plug in the outer ends of members 48, 50 without threadingly engaging such circular opening. The two part pressurized hand wheel 58 includes an inner face that brings pressure to bear on the piece or plug or on any outer end of 1) upper frame member 26, 2) upper frame member 28, 3) any of the upper frame members 48, 4) the threshold 24, and 5) any of the lower frame members 50. The disk 60 may be received in a receptacle shaped wall cup (not shown) that is anchored to a vertical surface by, for example, a pin connector. When the two part pressurized hand wheel 58 is turned so as to travel axially inwardly, the two part pressurized hand wheel 58 lengthens the effective distance of the threaded shaft 57 between the vertical surface 61 and the gated barrier 10, thereby pressurizing the gated barrier 10 and pushing in the latch receiver 18 to the latch apparatus 16.

Gate 14 includes a gate frame 66. Gate frame 66 includes a vertically extending end frame member 68 that defines the swing or pivot axis of the gate 14. Vertical frame member 68 is pivotally engaged between piece 34 and the upper face of threshold 24. Vertical frame member 68 is tubular, square in section, and formed of a metal such as steel or aluminum. A pin engages the upper end of vertical frame member 68 to piece 34 and another pin engages the lower end of vertical frame member 68 to the threshold 24. Opposite of vertical end frame member 68, gate frame 66 includes a vertically extending end frame member 70 that is tubular, square in section, and formed of a metal such as steel or aluminum.

Vertical end frame members 68, 70 are engaged to each other by an uppermost frame member 72 and a lowermost frame member 74. Frame members 72, 74 are tubular, square in section, and formed of metal such as steel or aluminum. Uppermost frame member 72 extends from an upper portion of vertical frame member 68, through the latch apparatus 16, to an upper portion of vertical end frame member 70. Lowermost frame member 74 extends from a lower portion of vertical frame member 68 to an L-shaped piece 75 that is fixed to and between ends of lowermost frame member 74 and vertical frame member 70.

Gate frame 66 includes a pair of internal vertical support members 76 that are equal in height. Gate frame 66 includes a pair of internal vertical support members 78 that are equal in height and have a longer length than internal vertical support members 76. Gate frame 66 includes a single internal vertical support member 80 that is longer length than internal vertical support members 76 and 78. Each of the internal vertical support members 76, 78, 80 is oblong in section, tubular, and formed of a metal such as steel or aluminum. Each of the internal vertical support members 76, 78, 80 is engaged to and between the uppermost frame member 72 and the lowermost frame member 74. Vertical support members 68, 70, 76, 78, 80 are adjacent to and spaced apart from at least one other vertical support member 68, 70, 76, 78, 80. End vertical support members 68, 70 are adjacent to and spaced apart from standards 20, 22, respectively.

Gate 14 includes a pair of turn up and turn down arms 82 that are pivotally affixed to the L-shaped piece 75. The arms 82 may be independent of each other, such that arms 82 may be turned up and down independently of the other arm 82. The arms 82 may be fixed to each other such that turning one arm 82 necessarily turns the other arm 82. The arms 82 engage opposing faces of the threshold 24 to prevent swinging of the gate 14 both ways or one way.

Figure 2:
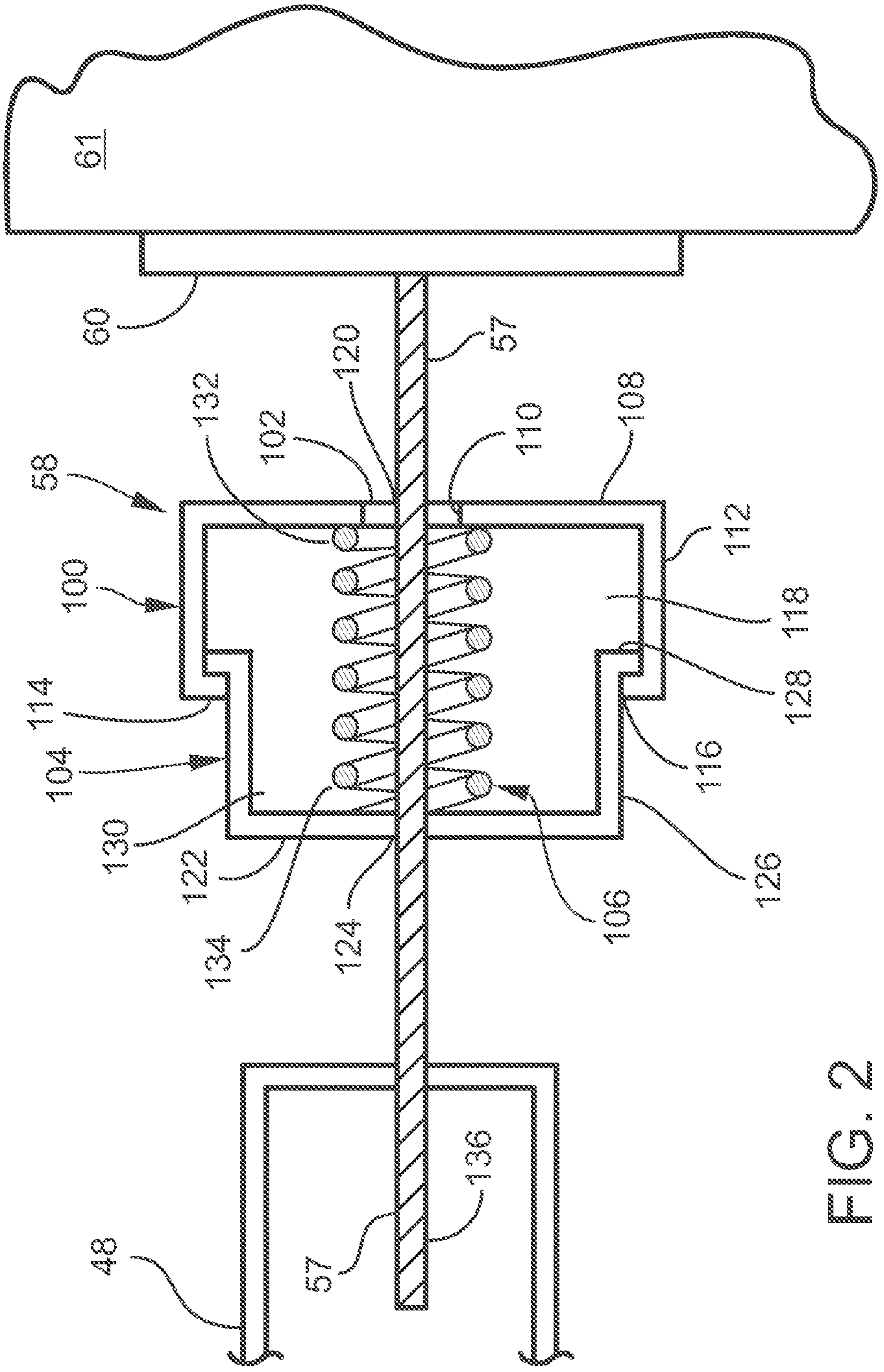
FIG. 2 is a schematic view of the present visual indicator between a portion of the gated pressurized barrier of FIG. 1 and an upright surface such as a door jamb.

As shown in FIG. 2, two part pressurized hand wheel 58, or visual indicator 58, includes a base portion 100 having a threaded nut 102, a slide portion 104, and a coil spring 106.

Base portion 100 is receptacle shaped and includes a disk shaped rear wall 108 having an opening 110 formed therein for receiving and engaging the threaded nut 102. An endless cylindrical sidewall 112 projects forwardly of the rear wall 108 from a peripheral edge of the rear wall 108. Sidewall 112 is L-shaped so as to form an inwardly extending and endless ledge 114. Endless ledge 114 defines an inner circular opening 116 that leads into an interior 118 of base portion 100.

Nut 102 is engaged in opening 110 and includes an opening 120 therein that receives shaft 57. Each of shaft 57 and opening 120 are threaded. Shaft 57 and nut 102 threadingly mate with each other such that when base portion 100 is rotated, base portion 100 travels axially along shaft 57. When base portion 100 is rotated one way, base portion 100 travels axially in a first direction. When base portion 100 is rotated the other way, base portion 100 travels axially in a second and opposite direction. Nut and base portion 100 are one-piece.

Slide portion 104 is receptacle shaped and includes a disk shaped front wall 122 having an opening 124 therein for receiving and floating on shaft 57. Opening 124 preferably does not threadingly engage shaft 57. Opening 124 has a diameter slightly greater than the outermost diameter of threaded shaft 57. An endless cylindrical sidewall 126 projects rearwardly of the front wall 122 from a peripheral edge of the front wall 122. Sidewall 126 is L-shaped so as to form an outwardly extending and endless ledge 128. Front wall 122 and sidewall 126 define a cylindrical shaped and receptacle shaped interior 130 of the slide portion 104. The outwardly extending ledge 128 of the slide portion 104 engages the inwardly extending ledge 114 of the base portion 100 so as to engage the slide portion 104 to the base portion 104.

Coil spring 106 at all times pushes the base portion 100 and slide portion 104 apart from each other. Coil spring 106 is compressed at all times in the two part pressurized hand wheel 58. Coil spring 106 includes a first end portion 132 that engages the front face of the rear wall 108 of the base portion 100. Coil spring 106 includes a second end portion 134 that engages the rear face of the front wall 122 of the slide portion 104. As base portion 100 and slide portion 104 are squeezed together, the pressure exerted by coil spring 106 increases.

To assemble the two part pressurized hand wheel 58, the base part 100 is first engaged on shaft 57 at the front end 136 of the shaft 57. Then the base part 100 is rotated so as to travel axially to a position adjacent to the disk 60 that engages the vertical surface 61. Then the coil spring 106 is slid onto the shaft 57 and into the interior 118 of the base portion 100. Then the slide portion 104 is slid onto the shaft 57 and snapped into the base portion 100 such that the ledges 114, 128 engage each other. As the slide portion 104 is snapped into the base portion 100, the coil spring 106 is compressed between the base portion 100 and slide portion 104. Then the shaft 57 may be inserted into the end of frame member 48 or into the plug or piece engaged in the end of frame member 48.

Figure 3A:
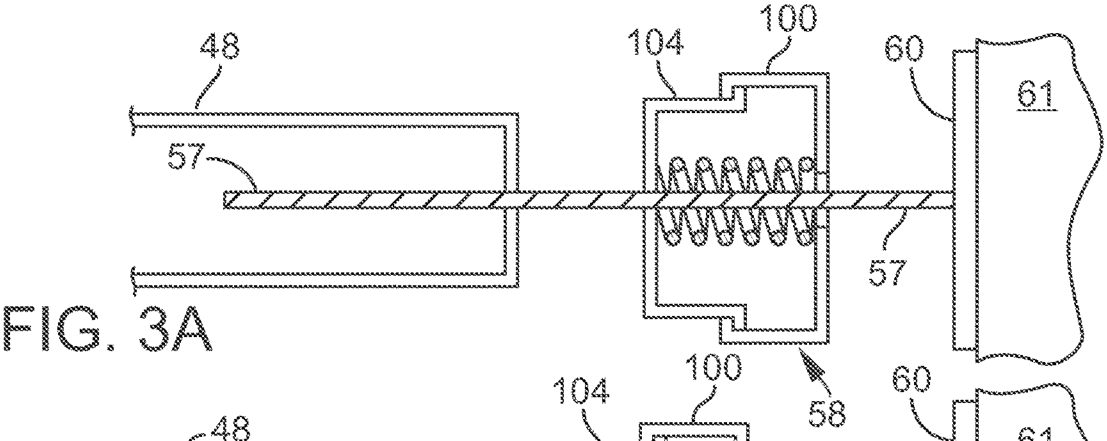
FIG. 3A is a schematic view of the present visual indicator between a portion of the gated pressurized barrier of FIG. 1 and an upright surface such as a door jamb.

As shown in FIG. 3A, hand wheel 58 and frame member 48 are spaced apart from each other.

Figure 3B:
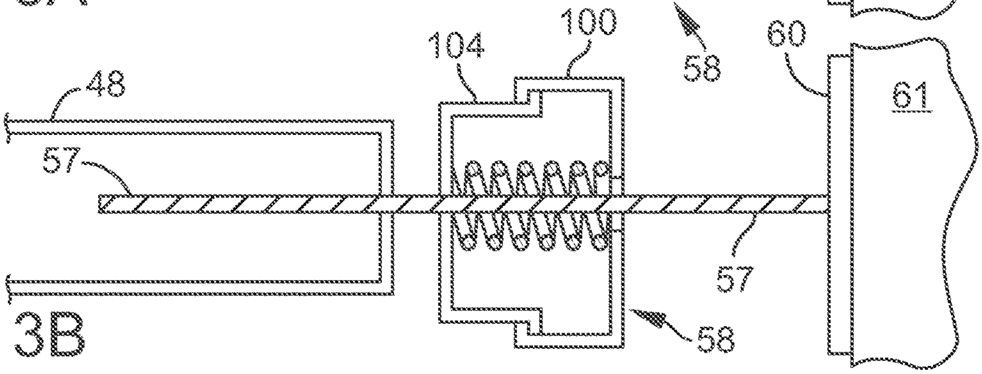
FIG. 3B is a schematic view of the visual indicator having been rotated closer to a frame member of the gated pressurized barrier than is shown in FIG. 3B.

As shown in FIG. 3B, hand wheel 58 and frame member 48 are spaced apart from each other. However, hand wheel 58 has been rotated so as to travel axially closer to frame member 48. Ledges 114, 128 frictionally engage each other such that a manipulation of slide 104 causes base portion 100 to rotate and such that a manipulation of base portion 100 causes slide portion 104 to rotate.

Figure 3C:
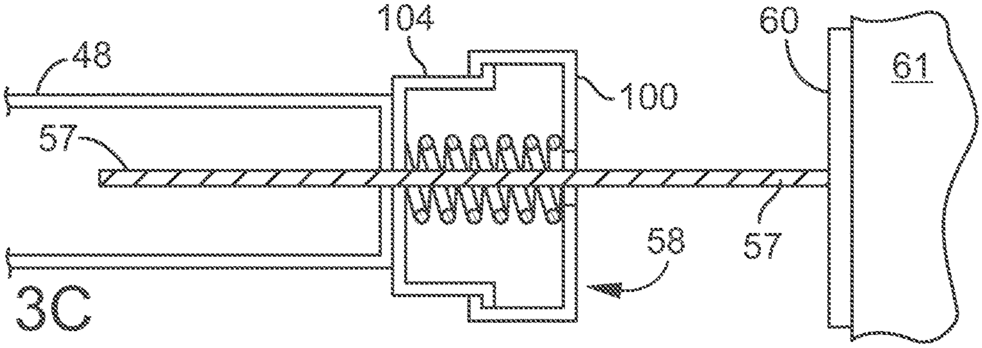
FIG. 3C is a schematic view of the visual indicator having engaged the frame member of FIG. 3B.

As shown in FIG. 3C, the hand wheel 58 has been further rotated so as to travel further axially such that the front wall 122 of the slide portion 104 has engaged the end of the frame member 48.

Figure 3D:
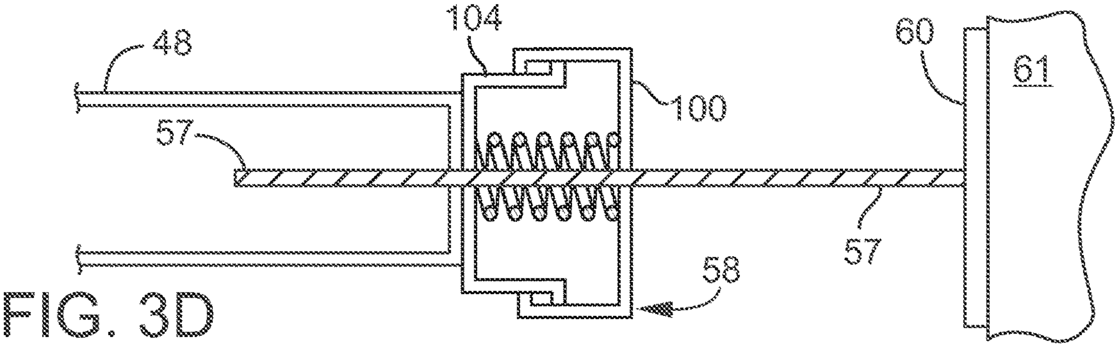
FIG. 3D is a schematic view of the visual indicator pushing the frame member of FIG. 3C inwardly and, at the same time, being squeezed by one part of the housing engaging the threaded shaft and continuing to travel axially and by the second part of the housing being relatively slowed down from travelling axially by the pressure of the frame member of the gated pressurized barrier.

As shown in FIG. 3D, the user manipulates base portion 100 to rotate base portion 100 forwardly while the slide portion 104 frictionally engages the end of the frame member 48 such that the slide ledge 128 disengages from the base ledge 114 such that the base ledge 114 begins to slide on the outer face of the slide sidewall 126. At the same time, the two part pressurized hand wheel 58 pushes in the frame member 48, which in turn pushes in frame member 28, which in turn draws the standard 22 closer to a vertical orientation and draws the latch receiver 18 closer to the latch apparatus 16.

Figure 3E:
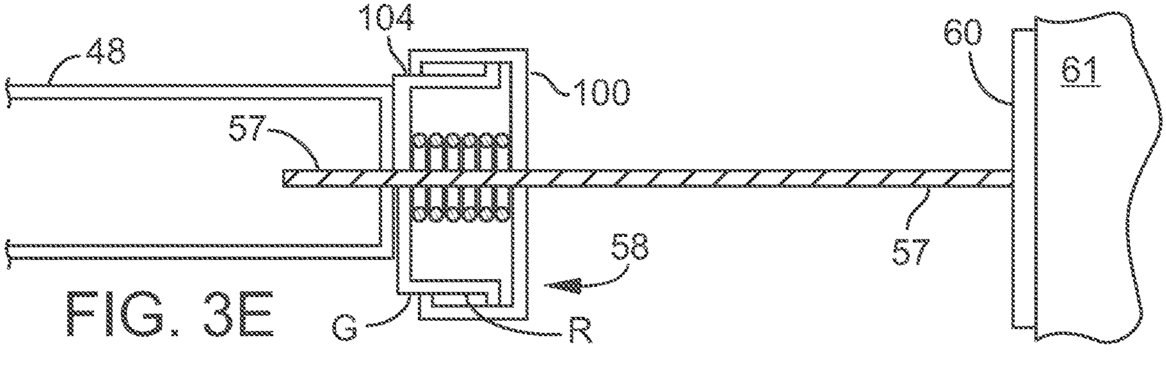
FIG. 3E is a schematic view of the visual indicator having traveled further axially than that shown in FIG. 3D, with the visual indicator having been squeezed to a selected state to indicate that the latch and latch receiver have been drawn to the proper position, where such proper position is indicated by one housing part covering all of a band on the second housing portion colored red and arriving at but not covering a band on the second housing portion colored green.

As shown in FIG. 3E, the user continues to manipulate base portion 100 to rotate base portion 100 further forwardly while the slide portion 104 continues to frictionally engage the end of the frame member 48 such that the base ledge 114, already disengaged from the slide ledge 128, continues to slide on the outer face of the slide sidewall 126. At the same time, the two part pressurized hand wheel 58 pushes in the frame member 48, which in turn pushes in frame member 28, which in turn draws in standard 22 to a position where the standard 22 is at a general right angle to threshold frame member 24 and where the latch 16 has engaged the latch receiver 18 such that the gated barrier 10, barrier frame 12, and gate 14 are in an operating position where the gate 14 is operable.

Figure 4:
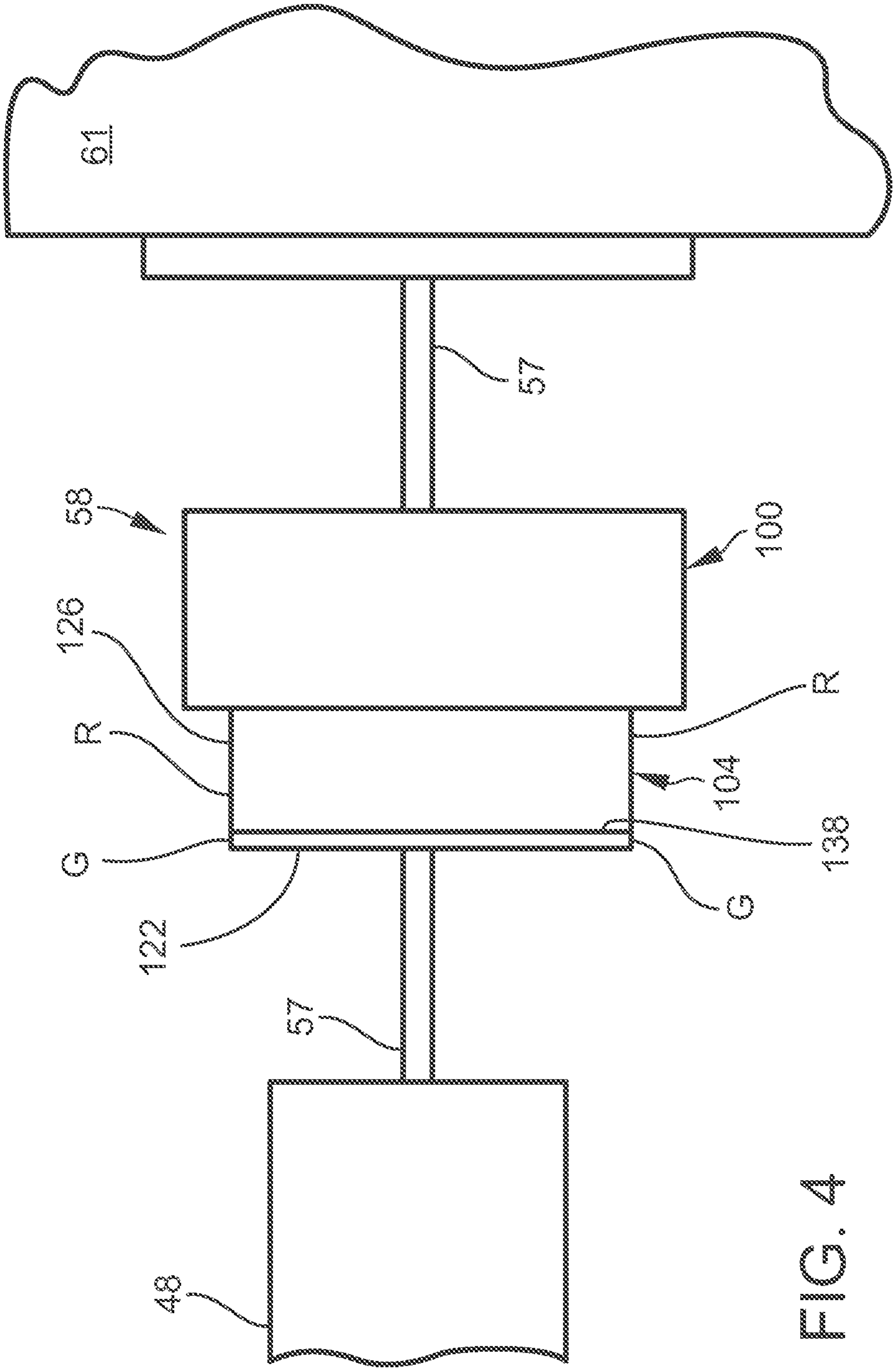
FIG. 4 is a top view of the visual indicator of FIG. 2, where the visual indicator is on a shaft extending between a frame member of the gated pressurized barrier and an upright surface.

As shown in FIG. 4, the entire cylindrical exterior of the cylindrical sidewall 126 of the slide portion 104 is of a first color, except for narrow cylindrical front band designated G that confronts the front wall 122 of the slide portion 104. In other words, cylindrical sidewall 126 has two cylindrical bands of color designated G (for green) and R (for red) where cylindrical band G confronts front wall 122 and extends rearwardly to cylindrical line 138, and where cylindrical band R extends rearwardly from cylindrical line 138 to ledge 128. When the two part pressurized hand wheel 58 is rotated through the positions shown in FIGS. 3A, 3B, 3C, 3D, and 3E, red band R slowly begins to be covered by the cylindrical sidewall 112 and ledge 114 of base portion 100 and thereby slowly disappears. When the ledge 114 arrives at cylindrical line 138, then latch 16 is properly aligned with the latch receiver 18 and the gated barrier 10 is in its proper operating position. It should be noted that the strength or compressive power or pressure of coil spring 106 is selected based upon the pressure required by the gate barrier 10 to draw the latch 16 to the latch receiver 18 such that the latch 16 and latch receiver 18 operate properly. The exterior sidewall 112 and ledge 114 of the base portion 100 are of a color different from green and different from red.

The present visual indicator 58 or two part pressurized hand wheel 58 may be used only at corner location 40 on the gated pressurized barrier and conventional hand wheels may be used at the other three locations 36, 38, and 42. However, if desired, the two part pressurized hand wheel 58 may be used at all four corner locations 36, 38, 40, and 42.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A visual indicator for being mounted between a gated pressurized barrier and an upright surface, the gated pressurized barrier having a gate, a latch, and a latch receiver, the visual indicator comprising:

a) a threaded shaft having first and second end portions, the first end portion extending into the gated pressurized barrier, the second end portion confronting the upright surface;

b) a base portion and a slide portion engaged to each other and slideable to and away from each other, the base portion threadingly engaged to the threaded shaft, the slide portion sliding on the threaded shaft;

c) a spring engaged between the base portion and the slide portion and directly on the threaded shaft, the spring being biased to continuously push the base portion and slide portion away from each other, the spring being compressed when the slide portion is stopped from sliding axially on the threaded shaft by a portion of the gated pressurized barrier and, when the slide portion stops sliding axially, the base portion continues to rotate so as to move axially over a portion of the slide portion until the base portion reaches an indicated position on the slide portion that indicates that the latch and latch receiver have been drawn to an operating position relative to each other; and d) wherein both the base portion and the slide portion are rotatable relative to said portion of the gated pressurized barrier during operation.

2. The visual indicator of claim 1, wherein a first section of the slide portion includes a first color, wherein a second section of the slide portion includes a second color, and wherein, when the base portion covers up the first color and encounters the second color, the latch and latch receiver have arrived at their respective operating positions.

3. The visual indicator of claim 1, wherein a pressure of the spring is selected based upon a pressure of the gated pressurized barrier.

4. A visual indicator for being mounted between a gated pressurized barrier and an upright surface, the gated pressurized barrier having a gate, a latch, and a latch receiver, the visual indicator comprising:

a) a threaded shaft having first and second end portions, the first end portion extending into the gated pressurized barrier, the second end portion confronting the upright surface;

b) a base portion and a slide portion engaged to each other and slideable to and away from each other, the base portion threadingly engaged to the threaded shaft, the slide portion sliding on the threaded shaft;

c) a mechanical device engaged between the base portion and the slide portion and on the threaded shaft, the mechanical device being biased to continuously push the base portion and slide portion away from each other, the mechanical device being compressed when the slide portion is stopped from sliding axially on the threaded shaft by a portion of the gated pressurized barrier and, when the slide portion stops sliding axially, the base portion continues to rotate so as to move axially over a portion of the slide portion until the base portion reaches an indicated position on the slide portion that indicates that the latch and latch receiver have been drawn to an operating position relative to each other;

d) wherein the mechanical device stores energy and subsequently releases it, the mechanical device comprising an elastic material, the mechanical device having first and second lengths, the first length being greater than the second length, the first length being under a first pressure, the second length being under a second pressure, the second pressure being greater than the first pressure; and e) wherein the base portion and the slide portion are each configured to rotate relative to said portion of the gated pressurized barrier during operation.

5. The visual indicator of claim 4, wherein a first section of the slide portion includes a first color, wherein a second section of the slide portion includes a second color, and wherein, when the base portion covers up the first color and encounters the second color, the latch and latch receiver have arrived at their respective operating positions.

6. A pressurization-responsive visual indicator assembly for a pressure-mounted gate, comprising:

a) a rotatable drive member threadingly engaged with a shaft;

b) a follower member telescopically surrounding at least a portion of the shaft and being axially translatable relative to the shaft without threaded engagement;

c) an elastic biasing member disposed between the drive member and the follower member;

d) the follower member being configured to engage a frame portion of the pressure-mounted gate and become axially stationary relative thereto;

e) the drive member being freely rotatable relative to the frame portion and configured to continue rotating after the follower member becomes axially stationary;

f) wherein continued rotation of the drive member causes axial translation of the drive member relative to the follower member and compression of the elastic biasing member;

g) the follower member including at least two differently appearing visual regions arranged axially;

h) the drive member being structured to alter which of the differently appearing visual regions is externally visible only after the elastic biasing member reaches a predetermined compressed state corresponding to a proper latch-to-receiver operating position of the gate; and i) wherein the drive member and follower member are each rotationally movable relative to the frame portion during operation.

* * * * *